United States Patent
Hajota et al.

(10) Patent No.: US 6,672,767 B2
(45) Date of Patent: Jan. 6, 2004

(54) DYNAMIC BEARING DEVICE AND MOTOR HAVING THE SAME

(75) Inventors: Kimihiko Hajota, Kyoto (JP); Hironori Itsusaki, Kyoto (JP); Tsugito Nakazeki, Kuwana (JP); Natsuhiko Mori, Kuwana (JP)

(73) Assignees: Nidec Corporation, Kyoto-fu (KR); NTN Corporation, Osaka-fu (JP)

( * ) Notice: Subject to any disclaimer, the term of this patent is extended or adjusted under 35 U.S.C. 154(b) by 0 days.

(21) Appl. No.: 10/178,952

(22) Filed: Jun. 25, 2002

(65) Prior Publication Data

US 2003/0002757 A1 Jan. 2, 2003

(30) Foreign Application Priority Data

Jun. 27, 2001 (JP) .......................................... 2001-195118
May 14, 2002 (JP) .......................................... 2002-138576

(51) Int. Cl.$^7$ ............................................. F16C 17/10
(52) U.S. Cl. ....................................................... 384/112
(58) Field of Search ................................. 384/112, 107, 384/119, 123, 121

(56) References Cited

U.S. PATENT DOCUMENTS 6,000,850 A * 12/1999 Takahashi et al. .......... 384/114
6,244,749 B1 * 6/2001 Nakagawa et al. ......... 384/114

FOREIGN PATENT DOCUMENTS

JP        2002-310159       10/2002

* cited by examiner

Primary Examiner—Lenard A. Footland
(74) Attorney, Agent, or Firm—Arent Fox Kintner Plotkin & Kahn (57) ABSTRACT

In the dynamic bearing device, a chamfer having a larger percentage of surface openings is continuous to the outer diameter side of a lower end surface of a bearing member, which constitutes a thrust bearing gap of a first thrust bearing part. A lubricating oil in pores of the bearing member is supplied to a gap portion through the surface openings of the chamfer, so that the gap portion can be kept at a positive pressure without becoming a negative pressure.

7 Claims, 8 Drawing Sheets

DYNAMIC BEARING DEVICE AND MOTOR HAVING THE SAME

BACKGROUND OF THE INVENTION

The present invention relates to a dynamic bearing device and a motor having the same. This bearing device can be appropriately applied in a spindle motor of an information-processing equipment such as a magnetic disk device (e.g., HDD or FDD), an optical disk device (e.g., CD-ROM or DVD-ROM), an optical magnetic device (e.g., MD or MO), a polygon scanner motor of a laser beam printer (LBP), or a small-sized motor of an electric equipment (e.g., an axial flow fan).

Heretofore, each of the motors described above has been in need of improvements on speeding up and noise-reduction of its rotary motion, cost-reduction in its production, and so on in addition to providing a rotary motion thereof with a high degree of precision. One of the structural factors that define these required performances is a bearing that supports a spindle of the motor. In recent years, for such a kind of the bearing, the usage of a dynamic bearing having excellent features for the above required performances has been considered or actually used in the art.

For instance, a dynamic bearing device to be incorporated in a spindle motor of a disk device such as a hard disk drive (HDD) includes a radial bearing part that makes a non-contact support of an shaft member in a rotatable manner in the radial direction and a thrust bearing part that makes a non-contact support of an shaft member in the thrust direction. The dynamic bearing device utilizes a dynamic bearing as each of these bearing parts. The dynamic bearing has grooves for generating dynamic pressure in the bearing surface. Hereinafter, such grooves will be referred to as dynamic pressure generating grooves. The dynamic pressure generating grooves of the radial bearing part are formed in the inner peripheral surface of a housing or a bearing member, or the outer peripheral surface of a shaft member. When an shaft member having a flange part is used, the dynamic pressure generating grooves of the thrust bearing part are formed in both surfaces of the flange part or the surfaces facing to the respective surfaces (e.g., the end surface of the bearing member and the bottom surface of the housing).

Figure 7:
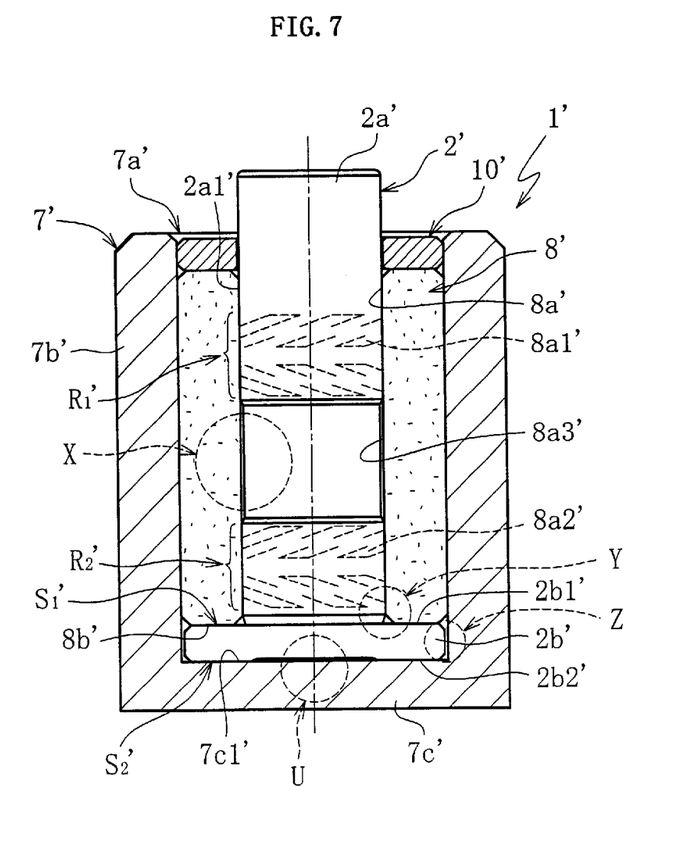
FIG. 7 is a cross sectional view illustrating a dynamic bearing device disclosed in the related application.

As the above dynamic bearing device, the present applicant has already proposed the constitution of a dynamic bearing device 1' shown in FIG. 7 as disclosed in Japanese Patent Application No. 2001-114317.

In FIG. 7, the dynamic bearing device 1' mainly includes a bottomed cylindrical housing 7' with an opening 7a' formed in its top end, an shaft member 2' and a bearing member 8' which are housed in the housing 7', and a sealing member 10, arranged on the opening 7a' of the housing 7'.

Figure 8A:
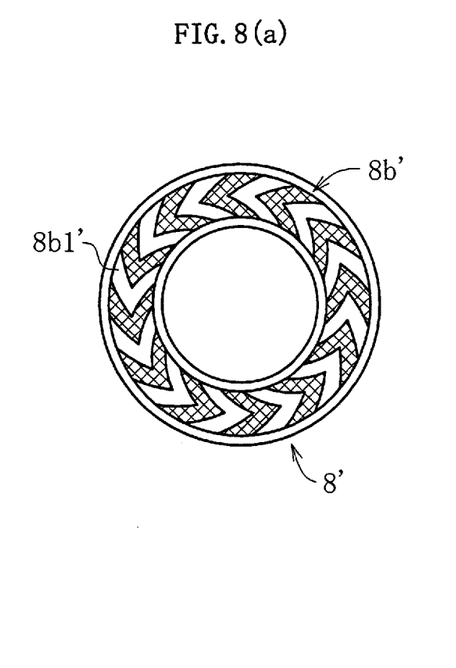
FIG. 8(a) and FIG. 8(b) are plan views illustrating dynamic pressure generating grooves formed in the thrust bearing part of the dynamic bearing device shown in FIG. 7, respectively.
Figure 8B:
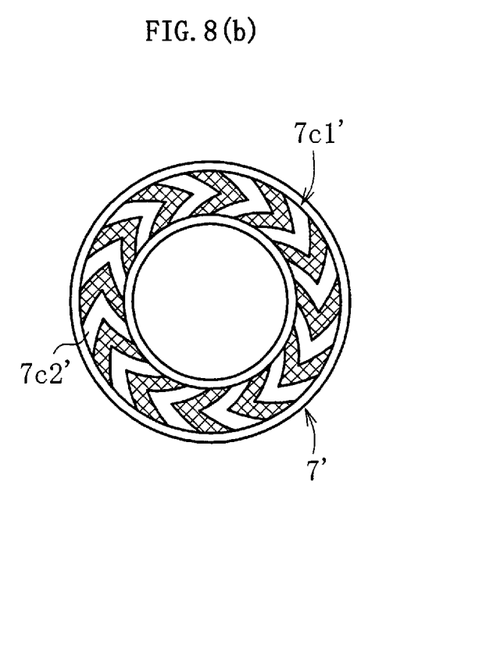

More concretely, the housing 7' includes a cylindrical side portion 7b' and a bottom part 7c'. Furthermore, the bottom part 7c' has an inner bottom surface 7c1'. In the area of the bottom surface 7c1' which serves as a thrust bearing surface, as shown in FIG. 8B, herringbone-shaped dynamic pressure generating grooves 7c2' are formed.

Furthermore, the bearing member 8' is constructed of a porous material made of sintered metal. Herringbone-shaped dynamic pressure generating grooves 8a1' and 8a2' as shown by the dotted lines in FIG. 7 are formed in the upper and lower areas which serve as radial bearing surfaces, respectively. These upper and lower areas are separated in the axial direction such that an area 8a3' having no dynamic pressure generating groove is arranged between the upper and lower areas. Furthermore, in an area, which serves as a thrust bearing surface, of the lower end surface 8b' of the bearing member 8', herringbone-shaped dynamic pressure generating grooves 8b1' shown in FIG. 8A are formed.

The shaft member 2' includes an axial part 2a' and a flange part 2b'. The flange part 2b' is integrally or separately formed on the axial part 2a'.

The axial part 2a' of the shaft member 2' is inserted in the inner peripheral surface 8a' of the bearing member 8'. The flange part 2b' is received in a space between the lower end surface 8b' of the bearing member 8' and the inner bottom surface 7c1' of the housing 7'. Predetermined Radial bearing gaps are formed between the upper and lower areas of the inner peripheral surface 8a' of the bearing member 8' which serves as radial bearing surfaces and the outer peripheral surface 2a1' of the axial part 2a', respectively. Predetermined thrust bearing gaps are formed between the area of the lower end surface 8b' of the bearing member 8' which serves as the thrust bearing surface and the upper surface 2b1' of the flange part 2b', and between the area of the inner bottom surface 7c1' of the housing 7' which serves as the thrust bearing surface Sand the lower surface 2b2' of the flange part 2b'.

The inner space of the housing 7' being sealed with a sealing member 10', including pores of the bearing member 8', is filled with a lubricating oil.

When the shaft member 2' rotates, a dynamic pressure action of the lubricating oil is generated in the radial bearing gaps, so that the axial part 2a' of the shaft member 2' is rotatably supported in the radial direction in a non-contact manner by the oil film of the lubricating oil formed in the radial bearing gaps. Thus, the radial bearing parts R1' and R2' which rotatably support the axial part 2a' in the radial direction in a non-contact manner are constituted. Simultaneously, a dynamic pressure action is generated in the thrust bearing gaps, so that the flange part 2b' of the shaft member 2' is rotatably supported in the thrust directions in a non-contact manner by the oil film of the lubricating oil formed in the thrust bearing gaps. Thus, the thrust bearing parts S1' and S2' which rotatably support the flange part 2b' in the thrust directions in a non-contact manner are constituted.

In the dynamic bearing device 1' constituted as above, the dynamic pressure generating grooves 8a' and 8a2' of the radial bearing parts R1' and R2' have their respective herringbone shapes which are symmetric with respect to the axial direction. Therefore, in the radial bearing part R1', the lubricating oil drawn from the both sides in the axial direction by the dynamic pressure generation grooves 8a' keeps its pressure balance at a position in proximity to the axial groove center of the dynamic pressure generating grooves 8a1. Likewise, in the radial bearing part R2', the lubricating oil drawn from the both sides in the axial direction by the dynamic pressure generating groove 8a2' keeps its pressure balance at a position in proximity to the axial groove center of the dynamic pressure generating grooves 8a2'. At this time, since the radial bearing surface of each of the radial bearing parts R1' and R2' has a plurality of surface openings, which are formed by the pores of the bearing member 8' opening to the surface, in the radial bearing gap, where the pressure of the lubricating oil increases, the lubricating oil is returned from the radial bearing gap into the inside of the bearing. In addition, since there is a drawing action of each of the dynamic pressure generating grooves 8a1' and 8a2', in the peripheral area of the radial bearing gap, the lubricating oil is supplied from the inside of the bearing into the radial bearing gap. The above pressure balance can be kept while being accompanied with such a circulation of the lubricating oil. However, there is a case that the dynamic pressure generating grooves $8a1'$ are formed with an asymmetric shape with respect to the axial direction as a result of manufacturing errors. In this case, the axial dimension of the lower groove region is larger than that of the upper groove region in the figure. Also, there is a case that the dynamic pressure generating grooves $8a2'$ are formed with an asymmetric shape with respect to the axial direction as a result of manufacturing errors. In this case, the axial dimension of the upper groove region is larger than that of the lower groove region in the figure. In these cases, between the upper and lower regions, there is a difference in the forces of drawing the lubricating oil into their grooves. As a result, the above pressure balance comes down. Therefore, the lubricating oil in the gap of an area between the radial bearing parts $R1'$ and $R2'$ (here, this gap is referred to as an X portion as shown by dotted circle in FIG. 7 and is larger than the radial bearing gap) is drawn into the radial bearing part $R1'$ and/or the radial bearing part $R2$, causing a negative pressure in the X portion. In addition, there is a case that the radial bearing gap of the radial bearing part $R1'$ is taper-shaped increasing upwardly as a result of manufacturing errors. Alternatively, there is another case that the radial bearing gap of the radial bearing part $R2'$ is taper-shaped increasing downwardly as a result of manufacturing errors. In these cases, a flow of the lubricating oil in the radial bearing gap to the increased gap side is generated as the pressure of the increased gap side becomes decreased. As a result, the above pressure balance comes down. Therefore, there is a case that the lubricating oil in the X portion is drawn into the radial bearing part $R1'$ and/or the radial bearing part $R2$, causing a negative pressure in the X portion.

In the above constitution of the dynamic bearing device $1'$, the dynamic pressure generating grooves $8b1'$ and $7c2'$ of the thrust bearing parts $S1'$ and $S2'$ have their respective herringbone shapes which are symmetric with respect to the radial direction. In the thrust bearing part $S1'$, the lubricating oil in the thrust bearing gap and in the surroundings thereof is drawn toward its radial groove center by means of the dynamic pressure generating grooves $8b1'$. Likewise, in the thrust bearing part $S2'$, the lubricating oil in the thrust bearing gap and in the surroundings thereof is drawn toward its radial groove center by means of the dynamic pressure generating grooves $7c2'$. Therefore, there is a case that a negative pressure may be caused in each of gaps as shown in FIG. 7, that is, a gap around the boundary between the axial part $2a'$ and the flange part $2b'$ (here, this gap is referred to as a Y portion as shown by dotted circle in FIG. 7), a gap at an inner diameter side region than the thrust bearing part $S'$ (here, this gap is referred to as a U portion as shown by dotted circle in FIG. 7 and is larger than the gap of the thrust bearing gap), and a gap between the outer peripheral surface of the flange part $2b'$ and the inner peripheral surface of the housing $7'$ (here, this gap is referred to as a Z portion as shown by dotted circle in FIG. 7 and is larger than the radial bearing gap).

If the negative pressure generated in the inside of the housing $7'$ is large, then a cavitation is generated and the air solved in the lubricating oil can be emerged as air bubbles. If such air bubbles are involved in the bearing part, the accuracy of a rotation can be degenerated, so that RRO (Repeatable Run Out) and NRRO (Non Repeatable Run Out) can be deteriorated. Furthermore, if the temperature increases while accompanying with the air bubble, as the expansion of the air bubble, the lubricating oil in the housing $7'$ is pushed out of the sealed space between the inner peripheral surface of the sealing member $10'$ and the outer peripheral portion of the axial part $2a'$. As a result, there is a possibility of causing the leak of the lubricating oil to the outside.

SUMMARY OF THE INVENTION

An object of the present invention is to prevent the generation of a negative pressure in the housing and a cavitation due to the negative pressure, thereby to increase in a rotational accuracy and a sealing performance against a lubricating oil in a dynamic bearing device and a motor having the same.

To attain the above object, there is provided a dynamic bearing device comprising a housing having an end with an opening and another end with a bottom part, an shaft member having an axial part and a flange part to be housed in the housing, a cylindrical bearing member to be housed in the housing, constituted by a porous body made of a sintered metal, at least one radial bearing part provided between an inner peripheral surface of the bearing member and an outer peripheral surface of the axial part, which supports the axial part in the radial direction in a non-contact manner by means of a dynamic pressure action of a lubricating oil to be caused in a radial bearing gap, thrust bearing parts provided between both surfaces of the flange part and an end surface of the bearing member and the bottom part of the housing, which support the flange part in the thrust directions in a non-contact manner by means of a dynamic pressure action of a lubricating oil to be caused in thrust bearing gaps, and a sealing member arranged in the opening of the housing, wherein an inner space of the housing including pores of the bearing member is filled with a lubricating oil, and wherein the bearing member comprises an area at the outer diameter side of an end surface area of the bearing member which constitutes the thrust bearing gap, the area having a percentage of surface openings of the pores larger than that of the end surface area.

In the above constitution of the dynamic bearing device, the radial bearing part may have dynamic pressure generating grooves which are shaped so that the lubricating oil in the radial bearing gap and its surroundings is drawn to the bottom part side of the housing.

In the above constitution of the dynamic bearing device, the thrust bearing part may have dynamic pressure generating grooves which are in the shape of one selected from a spiral shape by which the lubricating oil in the thrust bearing gap and its surroundings is drawn in the inner diameter direction and a herringbone shape by which the lubricating oil in the thrust bearing gap and its surroundings is drawn toward a radial center portion of the thrust bearing part.

In the above constitution of the dynamic bearing device, the area having the larger percentage of surface openings may be provided on an inclined surface which is formed in a direction that the thrust bearing gap increases at the outer diameter side of the end surface area of the bearing member, for example, a chamfered surface. Alternatively, the area having the larger percentage of surface openings may be provided by a recessed portion which is formed in the outer peripheral portion of the bearing member and continuous to the end surface area of the bearing member. Such a recessed portion may be also continuous to the end surface area of the bearing member at he opening side of the housing, however, it is preferable that the recessed portion is not continuous to the end surface area at the opening side. When the recessed portion is also continuous to the end surface area at the opening side, there is a possibility that the effects intended in the present invention cannot be obtained in a sufficient manner because the lubricating oil supplied from the surface openings of the recessed portion may flow toward the end surface at the opening side. The recessed portion may be provided as an axial groove.

To attain the above object, there is provided a motor comprising a bracket for holding a stator, a rotor making a relative rotation with the bracket, a rotor magnet generating a rotating magnetic field in corporation with the stator, and a dynamic bearing device supporting the rotation of the rotor, wherein the dynamic bearing device is constituted as described above. Such a motor may be appropriately applied in a spindle motor of an information-processing equipment such as a magnetic disk device (e.g., HDD or FDD), an optical disc device (e.g., CD-ROM or DVD-ROM), an optical magnetic device (e.g., MD or MO), a polygon scanner motor of a laser beam printer (LBP), or a small-sized motor of an electric equipment (e.g., an axial flow fan).

According to the present invention, it becomes possible to prevent the generation of the negative pressure in the housing and the cavitation due to the negative pressure. Thereby, it becomes possible to improve the rotational accuracy and the sealing performance against the lubricating oil in a dynamic bearing device and a motor having the same.

BRIEF DESCRIPTION OF THE DRAWINGS

In the accompanying drawings:

FIG. 2(a) is a cross sectional view of a dynamic bearing device according to an embodiment of the present invention, while

FIG. 3(a) is a cross sectional view of a bearing member, while

DETAILED DESCRIPTION OF THE PREFERRED EMBODIMENTS

Hereinafter, preferred embodiments of the present invention will be described with reference to the attached drawings.

Figure 1:
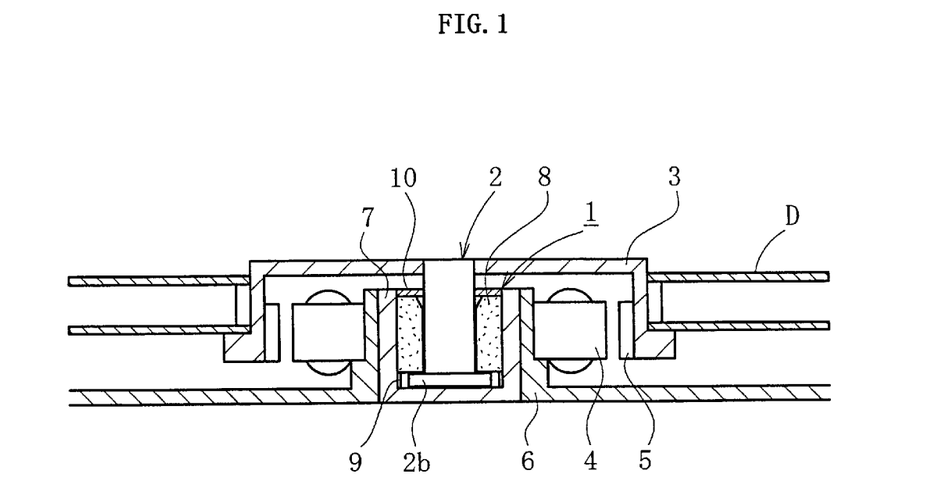
FIG. 1 is a cross sectional view of a spindle motor having a dynamic bearing device according to an embodiment of the present invention.

FIG. 1 shows the exemplified constitution of a spindle motor as one of preferred embodiments of the present invention. In this embodiment, the spindle motor is one to be used in a information-processing equipment. In addition, a dynamic bearing device 1 as one of preferred embodiments of the present invention is installed. In other words, the spindle motor is one to be used in a disk driving device such as a hard disk drive (HDD). The spindle motor comprises a dynamic bearing device 1 rotatably supporting a shaft member 2 in a non-contact manner, a rotor (disk hub) 3 attached to the shaft member 2, a stator 4 and a rotor magnet 5 facing to each other through a radial gap therebetween. The stator 4 is mounted on the outer periphery of a bracket 6, while the rotor magnet 5 is attached on the inner periphery of the rotor 3. A housing 7 of the dynamic bearing device 1 is attached on the inner periphery of the bracket 6. A single disk D (or a plurality of disks D) such as a magnetic disk is held on the rotor 3. When the stator 4 is energized, the rotor magnet 5 generates a rotating magnetic field together with the stator 4, so that the rotor 3 and the shaft member 2 are rotated together.

Figure 2A:
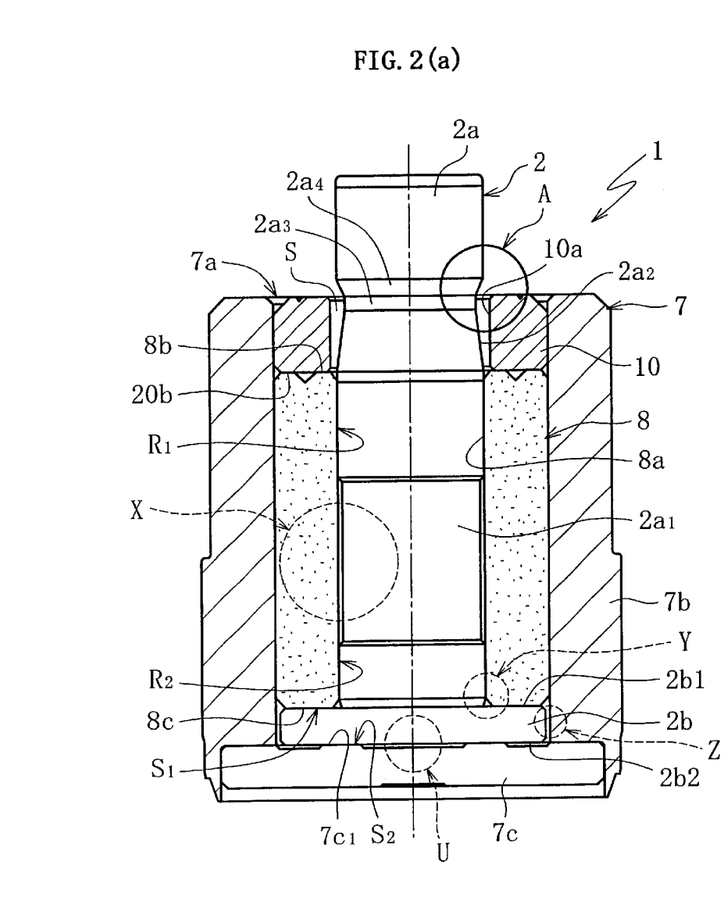
Figure 2B:
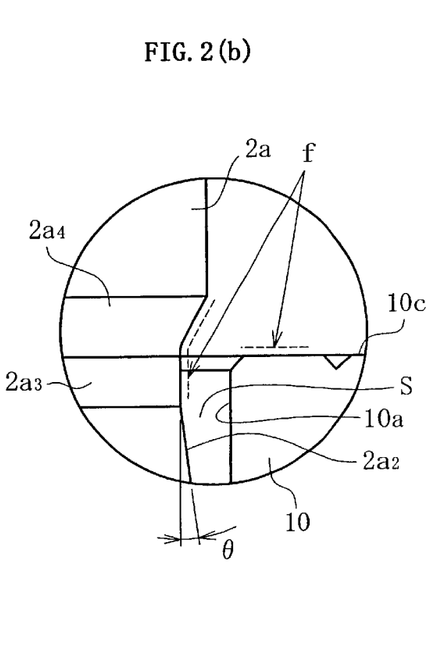
FIG. 2(b) is an enlarged view of the portion A in FIG. 2(a)

Referring now to FIGS. 2(a) and 2(b), the constitution of the dynamic bearing device 1 will be described. As shown in FIG. 2(a), the dynamic bearing device 1 mainly includes the bottomed cylindrical housing 7 having an end with an opening 7a and an another end with a bottom part 7c, a cylindrical bearing member 8 fixed on the inner periphery of the housing 7, the shaft member 2, and a sealing member 10 fixed in the opening 7a of the housing 7. As will be described later, a first radial bearing part R1 and a second radial bearing part R2 are arranged between the inner peripheral surface 8a of the bearing member 8 and the outer peripheral surface of the axial part 2a of the shaft member 2 such that the first and second radial bearing parts R1 and R2 are apart from each other in the axial direction. In addition, a first thrust bearing part S1 is provided between the lower end surface 8c of the bearing member 8 and the upper surface 2b1 of a flange part 2b of the shaft member 2. Also, a second thrust bearing part S2 is provided between the inner bottom surface 7c1 of the bottom part 7c of the housing 7 and the lower surface 2b2 of the flange part 2b. Furthermore, for a brief explanation, the direction toward the opening 7a of the housing 7 is defined as an upward direction. On the other hand, the direction toward the bottom part 7c of the housing 7 is defined as a downward direction.

Figure 4:
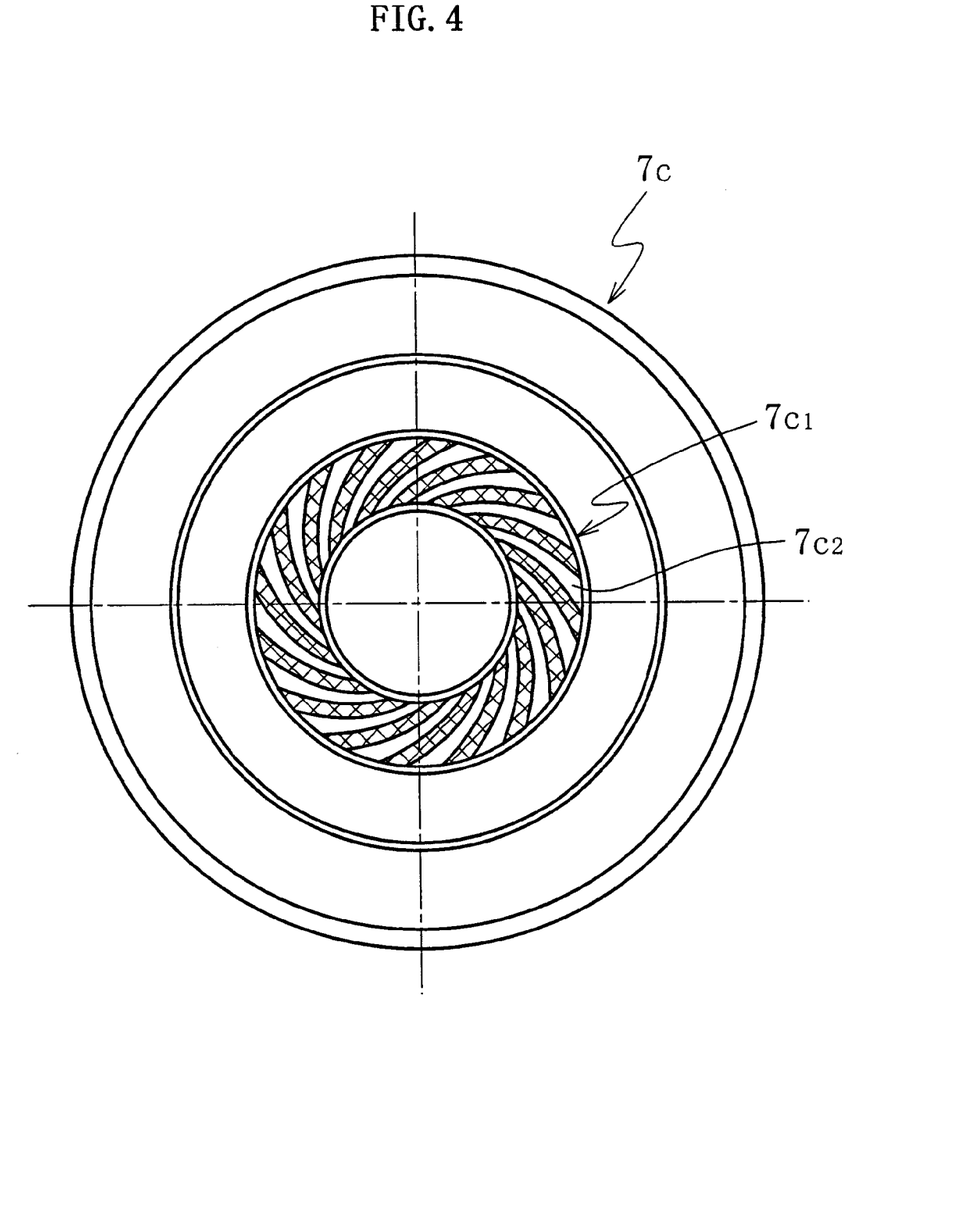
FIG. 4 is a schematic view illustrating an inner bottom surface of the housing.

The housing 7 may be made of a soft metallic material such as brass. Such a housing 7 has a cylindrical side portion 7b and a bottom part 7c. The inner bottom surface 7c1 of the bottom part 7c has an area which serves as a thrust bearing surface, that is a surface constitutes a thrust bearing gap of the second thrust bearing part S2. In such an area, dynamic pressure generating grooves 7c2 are formed. As shown in FIG. 4, for example, these grooves 7c2 may be in the shape of a spiral. In this embodiment, furthermore, the housing 7 is constructed of independent structural components, the side portion 7b and the bottom part 7c. A cap member to be the bottom part 7c is fixed to an opening at another end of the side portion 7b by means of caulking, bonding or the like. Alternatively, the side part 7b and the bottom part 7c may be integrally formed with each other.

The shaft member 2 may be made of a metal material such as stainless steel (SUS420J2 based on JIS G4304-1999). The shaft member 2 comprises an axial part 2a and a flange part 2. The flange part 2b can be integrally or independently formed at the lower end of the axial part 2a. In the outer peripheral surface of the axial part 2, an annular groove 2a1 and a tapered surface 2a2 are formed. The tapered surface 2a2 has a taper angle θ by which the radius of the shaft member 2 gradually decreases in the upward direction. In addition, a cylindrical surface 2a3 and a tapered surface 2a4 are continuously extended from the tapered surface 2a2 in the upward direction and their lengths in the axial direction are relatively short. Furthermore, the tapered surface 2a4 has a taper angle reverse to that of the taper surface 2a2.

Figure 3A:
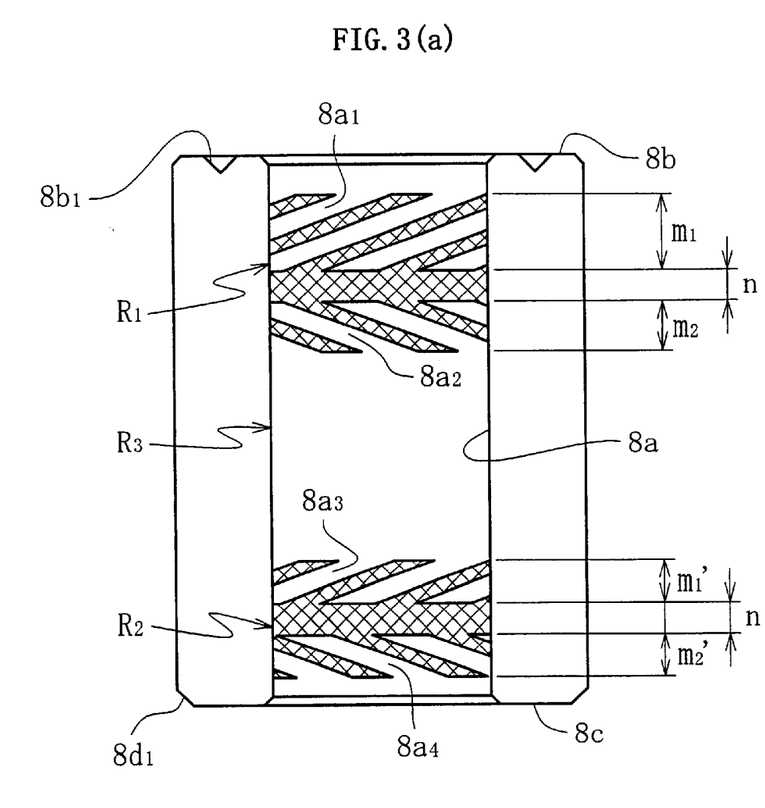

The bearing member 8 is provided as a porous body made of a sintered metal, especially a porous body made of a sintered metal mainly containing cupper. The bearing member 8 has pores (pores of the metallographic structure of a sintered metal) and surface openings formed by the pores opening to the surface. In addition, two areas (i.e., upper and lower areas) are formed on the inner peripheral surface 8a of the bearing member 8 in the state of being separated with each other in the axial direction, which serve as radial bearing surfaces (i.e., surfaces 17, constituting the radial bearing gaps of the first and second radial parts R1 and R2).

As shown in FIG. 3(a), the area which serves as the radial bearing surface of the first radial bearing part R1 has herringbone-shaped dynamic pressure generating grooves. For examples, such an area comprises a first area m1 on which dynamic pressure generating grooves 8a1 inclined in one axial direction are arranged in the circumferential, a second area m2 on which dynamic pressure generating grooves 8a1 inclined in the other axial direction are arranged in the circumferential direction, and an annular portion n between the first area m1 and the second area m2. An axial length of the first area m1 is larger than that of the second area m2. The dynamic pressure generating grooves 8a1 of the first area m1 and the dynamic pressure generating grooves 8a2 of the second area m2 are asymmetric in the axial direction with respect to the center of the annular portion n (i.e., the axial groove center thereof). In addition, as shown in FIG. 3(a), the first area m1 which is axially long is located at the upper side (the side of the opening 7a of the housing 7), the second area m2 which is axially short is located at the lower side (the side of the bottom 7c of the housing 7) in the figure. Likewise, the area serving as the radial bearing surface of the second bearing part R2 has herringbone-shaped dynamic pressure generating grooves. Such an area comprises a first area m1' on which dynamic pressure generating grooves 8a3 inclined in one axial direction are arranged in the circumferential, a second area m2' on which dynamic pressure generating grooves 8a4 inclined in the other axial direction are arranged in the circumferential direction, and an annular portion n' between the first area m1' and the second area m2'. However, different from the first radial bearing part R1, an axial length of the first area m1' is equal to an axial length of the second area m2'.

The dynamic pressure generating grooves 8a3 of the first area m1' and the dynamic pressure generating grooves 8a4 of the second area m2' are axially symmetrical with each other with respect to the axial center of the annular portion n' (the center of the axial groove). In addition, a total length of the first radial bearing part R1 in the axial direction (i.e., m1+m2+n) is larger than that of the second radial bearing part R2 (m1'+m2'+n').

Figure 3B:
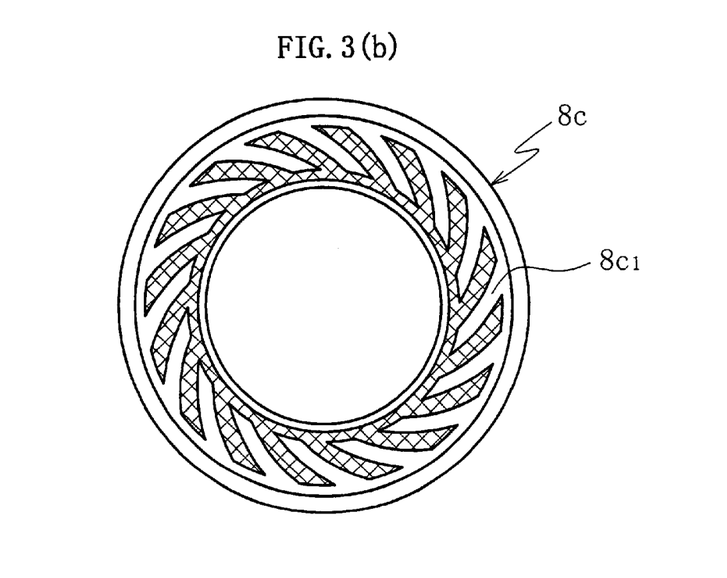
FIG. 3(b) is a schematic view illustrating a lower end surface of the bearing member shown in FIG. 3(a)

A circumferential groove 8b1 is formed in the upper end surface 8b of the bearing member 8, which serves as a mark for distinguishing between the upper and lower directions. In addition, as shown in FIG. 3(b), the lower end surface 8c of the bearing member 8 has the area which serves as the thrust bearing surface (i.e., surface constituting the thrust bearing gap of the first thrust bearing part) has dynamic pressure generating grooves 8c1 in the shape of a spiral. Further, in this embodiment, the outer and inner circumferences at the lower end and the outer and inner circumferences at the upper end are provided with chamfers respectively, the dimension of the chamfer 8d1 on the outer circumference at the lower end is larger than that of the chamfers on the other portions.

Prior to the formation of dynamic pressure generating grooves 8a1–8a4, an inner diameter and a percentage of surface openings of the pores (a percentage of area of the surface openings per unit area) of the inner peripheral surface of the bearing member 8 are adjusted by means of sizing or the like. In each of the radial bearing parts R1 and R2, for example, a percentage of surface openings of the radial bearing surface thereof is defined to 2% or mote but less than 10%, preferably 2 to 5%, including the areas of dynamic pressure generating grooves 8a1 to 8a4. In addition, prior to the formation of dynamic pressure generating grooves 8c1, for the lower end surface 8c of the bearing member 8, a right angle between the lower end surface 8c and the inner peripheral surface of the bearing member 8 and a percentage of surface openings are adjusted by means of a burnishing treatment (fretting treatment). The percentage of surface openings of the lower end surface 8c (the thrust bearing surface of the first thrust bearing part S1) is defined to 2% or more but less than 10%, preferably 2 to 5%, including the areas of dynamic pressure generating grooves 8c1. On the other hand, the chamfer 8d1 on the outer circumference at the lower end is not subjected, to the burnishing treatment (fretting treatment), so that the percentage of surface openings of the chamfer 8d1 is larger than the percentage of surface openings of the lower end surface 8c which constitutes the thrust bearing gap. For example, it is defined to 10% or more, preferably 15% or more. The bearing member 8 thus constructed has an air permeability of $1.0 \times 10^{-10}$ to $1.0 \times 10^{-13}$, preferably $5.0 \times 10^{-11}$ to $5.0 \times 10^{13}$. In addition, the percentage of surface openings of each of chamfers on the inner circumference at the lower end, and on the inner and outer circumferences at the upper end may be the same as or smaller than that of the chamfer 8d1. Further, the dimension of each of chamfers on the inner circumference at the lower end, and on the inner and outer circumferences at the upper end may be the same as that of the chamfer 8d1.

Here, the "percentage of surface openings" in the present specification is measured under the following conditions.

Measuring Instruments

Metaloscope: Nikon Eclipss ME600

Digital camera: Nikon DXM1200

Photographic software: Nikon ACT-1 (Version 1)

Image-processing software: Quick Grain, Innotech Corporation

Measuring Conditions

Photography: shutter speed 0.5 seconds

Threshold of binarization: 235

As shown in FIG. 1, the sealing member 10 is shaped like a ring. The sealing member 10 is fixed on the inner peripheral surface of the opening 7a of the housing 7 by means of press-fitting, bonding or the like. In this embodiment, the inner peripheral surface 10a of the sealing member 10 is formed as a cylindrical surface, and the lower end surface 10b of the sealing member 10 contacts with the upper end surface 8b of the bearing member 8.

The axial part 2a of the shaft member 2 is inserted into the inner peripheral surface 8a of the bearing member 8. On the other hand, the flange part 2b is received in a space between the lower end surface 8c of the bearing member 8 and the inner bottom surface 7c1 of the housing 7. Two areas (i.e., upper and lower areas) which serve as radial bearing surfaces of the inner peripheral surface 8a of the bearing member 8 face the outer peripheral surface of the axial part 2a through the radial bearing gaps, respectively. In addition, the area which serves as the thrust bearing surface of the lower end surface 8c of the bearing member 8 faces the upper surface of the flange part 2b through the thrust bearing gap. The area which serves as the thrust bearing surface of the inner bottom surface 7c1 of the housing 7 face the lower surface of the flange part 2b through the thrust bearing gap. There is a gap (X portion) larger than the radial bearing gap is formed between the annular groove 2a1 of the axial part 2a and the inner peripheral surface 8a of the bearing member 8 (the area between the radial bearing parts R1 and R2). Furthermore, a gap (Y portion) is formed around the boundary between the axial part 2a and the flange part 2b, while a gap (U portion) larger than the thrust bearing gap is formed in the area of the inner diameter side of the second thrust bearing part S2. In addition, a gap (Z portion) larger than the radial bearing gap between the outer peripheral surface of the flange part 2b and the inner peripheral surface of the housing 7.

The tapered surface 2a2 of the axial part 2a faces the inner peripheral surface 10a of the sealing member 10 through the predetermined gap, thereby a tapered sealing space S which is gradually increased toward the outer direction of the housing 7 (the upper direction in the figure) is formed therebetween. An inner space of the housing 7 sealed with the sealing member 10, including the pores of the bearing member 8, is filled with a lubricating oil and the oil surface of the lubricating oil is in the sealed space S. The volume of the sealed space S is adjusted such that it will be larger than variations in the volume of the lubricating oil filled in the inner space of the housing 7 with variations in temperature within the range of working temperature. Consequently, even though the volume of the lubricating oil changes as the temperature changes, the oil surface of the lubricating oil can be always maintained in the sealed space S.

When the shaft member 2 rotates, the dynamic pressure of the lubricating oil is generated in the radial bearing gaps. Thereby, the axial part 2a of the shaft member 2 is rotatably supported in the radial direction by the oil film of the lubricating oil formed in the radial bearing gaps in a non-contact manner. Thus, the first radial bearing part R1 and the second radial bearing part R2 are constituted such that they rotatably support the shaft member 2 in the radial direction in a non-contact manner. Simultaneously, the dynamic pressure of the lubricating oil is generated in the thrust bearing gaps. Thereby, the flange part 2b of the shaft member 2 is rotatably supported in the thrust directions by the oil film of the lubricating oil formed in the thrust bearing gaps in a non-contact manner. Thus, the first thrust bearing part Si and the second thrust bearing part S2 are constituted such that they rotatably support the shaft member 2 in thrust directions in a non-contact manner.

In the dynamic bearing device 1, the dynamic pressure generating grooves 8a1 and 8a2 of the radial bearing part R1 are asymmetric with each other about the axial direction. Furthermore, the groove area (m1) having a longer length in the axial direction is located on the opening 7a side of the housing 7 (upper side), while the groove area (m2) having a shorter length in the axial direction is located on the bottom part 7c side of the housing 7 (lower side). Therefore, due to the difference pressure of the drawing force for the lubricating oil between the groove areas m1 and m2, to put it concretely, since the drawing force for the lubricating oil is relatively large in the groove area m1 having the longer axial length, while the drawing force for the lubricating oil is relatively small in the groove area m2 having the shorter axial length, the flow of lubricating oil is generated from the inside of the radial gap of the radial bearing part R1 to the X portion. Consequently, the X portion can be kept in a positive pressure without becoming negative.

In the first thrust bearing part S1, furthermore, the lubricating oil in the thrust bearing gap is drawn toward the inner diameter direction by the spiral-shaped dynamic pressure generating grooves Bc1 formed on the lower end surface 8c of the bearing member 8 to supply to the Y portion. Therefore, the Y portion can be kept at a positive pressure without becoming a negative pressure. In the second thrust bearing part S2, simultaneously, the lubricating oil in the thrust bearing gap is drawn toward the inner diameter direction by the spiral-shaped dynamic pressure generating grooves 7c2 formed on the inner bottom surface 7c1 of the housing 7 to supply to the U portion. Therefore, the U portion can be kept at a positive pressure without becoming a negative pressure. On the other hand, the chamfer 8d1 having the larger percentage of surface openings is continuous to the outer diameter side of the lower end surface 8c of the bearing member 8, which constitutes the thrust bearing gap of the first thrust bearing part S1. Thus, the lubricating oil in the pores of the bearing member 8 is supplied to the Z portion through the surface openings of the chamfer 8d1, so that the Z portion can be kept at a positive pressure without becoming a negative pressure.

Consequently, the dynamic bearing device 1 is capable of keeping the whole portions in the inside of the housing 7 at a positive pressure without causing a negative pressure.

Furthermore, as the oil surface of the lubricating oil is in the sealed space S, the lubricating oil in the sealed space S is drawn by a capillary force in the direction along which the sealed space S is narrowed (the internal direction of the housing 7, i.e., the downward direction). Therefore, it becomes possible to prevent leakage of the lubricating oil from the housing 7 to the outside. In addition, as the tapered surface 2a2 is formed on the outer peripheral surface of the axial part 2a, the lubricating oil in the sealed space S receives centrifugal force during the rotation of the shaft member 2 to be drawn along the tapered surface 2a2 in the direction along which the sealed space S is narrowed (the internal direction of the housing 7: the downward direction). Therefore, the leakage of the lubricating oil can be more effectively prevented because of the drawing action of the centrifugal force in addition to the drawing action of the capillary force. In addition, the lubricating oil in the sealed space S is drawn in the internal direction (downward) of the housing 7 by the pressure difference in the first radial bearing part R1. Therefore, the leakage of the lubricating oil can be more effectively prevented.

In this embodiment, furthermore, the leakage of the lubricating oil can be more effectively prevented by applying an oil repellency agent to at lest one of the outer peripheral surface of the axial part 2a and the surface of the sealing member 10 adjacent to the sealed space S. In an example shown in FIG. 2(b) as an enlarged view, an oil repellency agent f is applied on the cylindrical surface 2a3 and the tapered surface 2a4 located on the upper side of the tapered surface 2a2 of the axial part 2a, and the inner diameter side area (the area represented by a dot line in the figure) of the upper end surface 10c of the sealing member 10.

Figure 5:
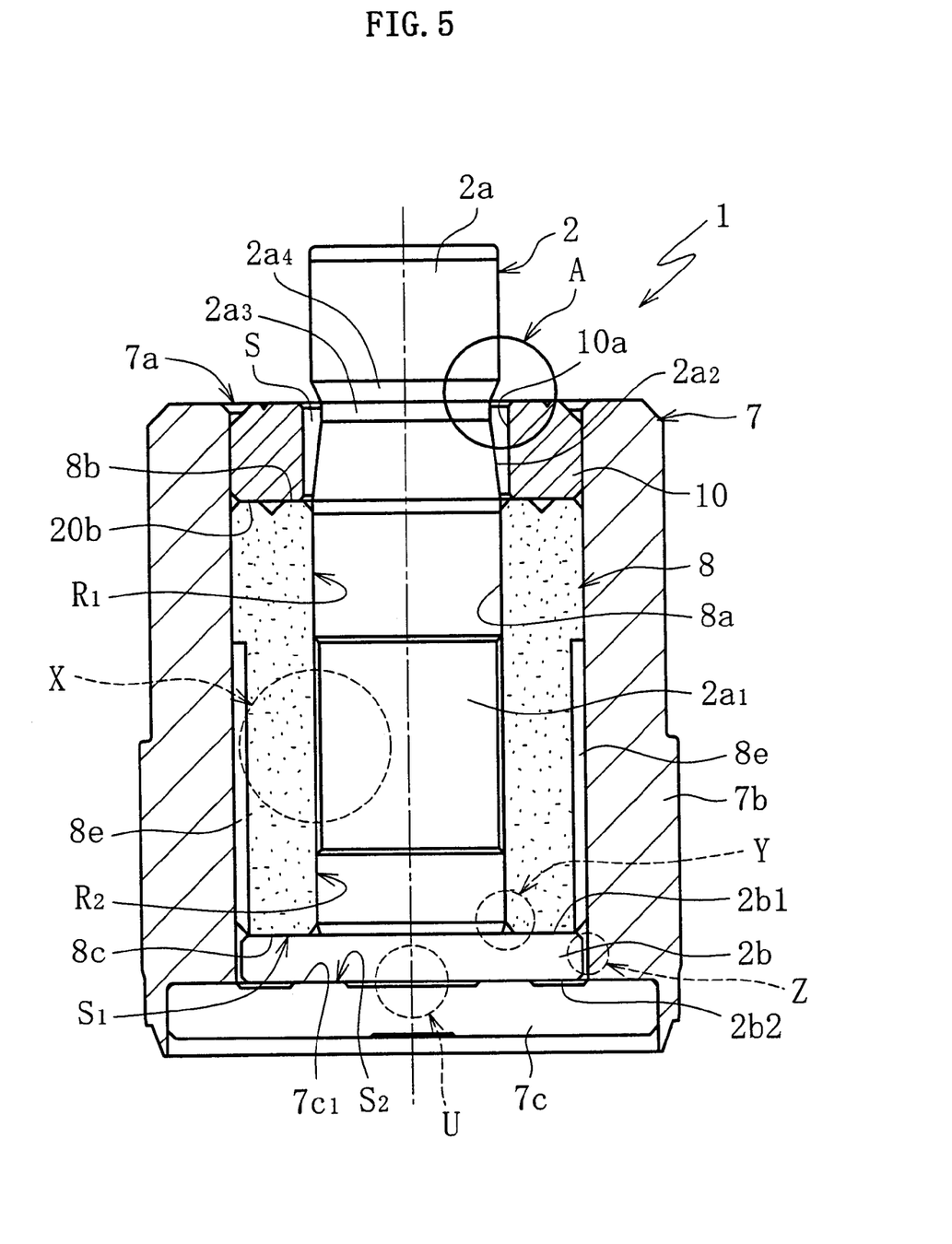
FIG. 5 is a cross sectional view illustrating a dynamic bearing device according to another embodiment of the present invention.

Referring now to FIG. 5, there is shown a second embodiment of the present invention. In this embodiment, the bearing member 8 is subjected to a barrel processing prior to the formation of dynamic pressure generating grooves 8a1–8a4 and 8b1, followed by sealing treatments on the outer peripheral surface, end surfaces 8b, 8c, and chamfer 8d1, respectively. In this case, the inner peripheral surface 8a is subjected to the sizing or the like. A medium to be used in the barrel processing does not contact with the inner peripheral surface 8a. Therefore, a plurality of axial grooves 8e having their respective widths enough to prevent the contact with the media at the time of barrel processing are formed in the outer peripheral portion of the bearing member 8, such that these axial grooves 8e are continuous to the outer diameter side of the lower end surface 8c of the bearing member 8, which constitutes the thrust bearing gap of the first thrust bearing part S1. As the sealing treatment with the barrel processing is not performed on the axial grooves 8e, the percentage of surface openings thereof can be secured so as to be lager than that of the lower end surface 8c constituting the thrust bearing gap, for example, with 10% or more, preferably 15% or more. Thus, the lubricating oil in the pores of the bearing member 8 is supplied to the Z portion through the surface openings of the axial direction groove 8e, so that Z portion can be kept at a positive pressure without becoming a negative pressure.

Figure 6:
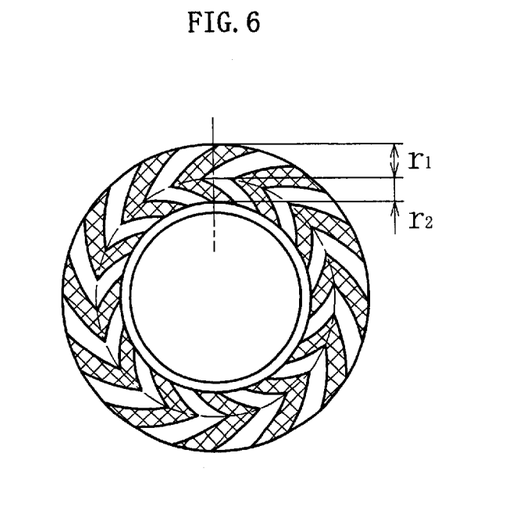
FIG. 6 is a plan view illustrating another configuration of dynamic pressure generating grooves of the thrust bearing part.

As shown in FIG. 6, moreover, the dynamic pressure generating grooves formed in the lower end surface 8c of the bearing member 8 and/or the dynamic pressure generating grooves formed in the inner bottom surface 7C1 of the housing 7 may be provided in the shape of herringbone. In this case, each of them may be non-symmetrical in the radial direction such that the radial dimension r1 of the outer diameter side is larger than the radial dimension r2 of the inner diameter side.

Figure 9:
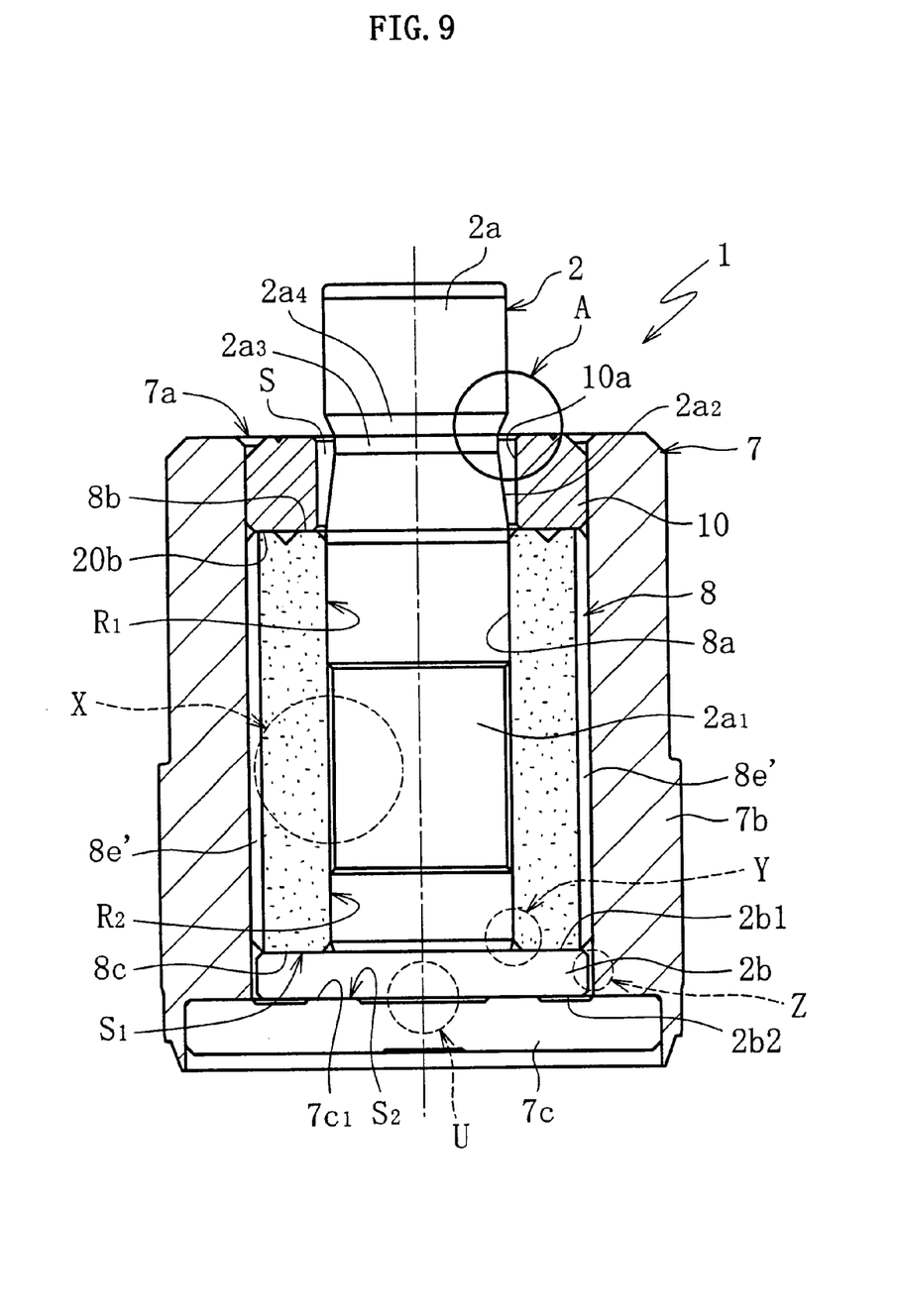
FIG. 9 is a cross sectional view illustrating a dynamic bearing device according to another embodiment of the present invention.

As shown in FIG. 9, furthermore, the axial grooves 8e' formed in the outer peripheral portion of the bearing member 8 may be continuous to both the upper end surface 8b and the lower end surface 8c of the bearing member S.

What is claimed is:

1. A dynamic bearing device comprising: a housing having an end with an opening and another end with a bottom part;

a shaft member having an axial part and a flange part to be housed in the housing;

a cylindrical bearing member to be housed in the housing, constituted by a porous body made of a sintered metal;

at least one radial bearing part provided between an inner peripheral surface of the bearing member and an outer peripheral surface of the axial part, which support the axial part in the radial direction in a non-contact manner by means of a dynamic pressure action of a lubricating oil to be caused in a radial bearing gap;

thrust bearing parts provided between both surfaces of the flange part and an end surface of the bearing member and the bottom part of the housing, which support the flange part in the thrust directions in a non-contact manner by means of a dynamic pressure action of a lubricating oil to be caused in thrust bearing gaps; and a sealing member arranged in the opening of the housing, wherein an inner space of the housing including pores of the bearing member is filled with a lubricating oil, and wherein the bearing member comprises an area at the outer diameter side of an end surface area of the bearing member which constitutes the thrust bearing gap, the area having a percentage of surface openings of the pores larger than that of the end surface area.

2. The dynamic bearing device according to claim 1, wherein the radial bearing part has dynamic pressure generating grooves which are shaped so that the lubricating oil in the radial bearing gap and its surroundings is drawn to the bottom part side of the housing.

3. The dynamic bearing device according to claim 1, wherein the thrust bearing part has dynamic pressure generating grooves which are in the shape of one selected from:

a spiral shape by which the lubricating oil in the thrust bearing gap and its surroundings is drawn in the inner diameter direction; and a herringbone shape by which the lubricating oil in the thrust bearing gap and its surroundings is drawn toward a radial center portion of the thrust bearing part.

4. The dynamic bearing device according to claim 1, wherein the area having the larger percentage of surface openings is provided on an inclined surface which is formed in a direction that the thrust bearing gap increases at the outer diameter side of the end surface area of the bearing member.

5. The dynamic bearing device according to claim 1, wherein the area having the larger percentage of surface openings is provided by a recessed portion which is formed in the outer peripheral portion of the bearing member and continuous to the end surface area of the bearing member.

6. The dynamic bearing device according to claim 5, wherein the recessed portion is an axial groove.

7. A motor comprising a bracket for holding a stator, a rotor making a relative rotation with the bracket, a rotor magnet generating a rotating magnetic field in corporation with the stator, and a dynamic bearing device supporting the rotation of the rotor, wherein the dynamic bearing device is one described in any one of claims 1 to 6.

* * * * *

UNITED STATES PATENT AND TRADEMARK OFFICE
CERTIFICATE OF CORRECTION

PATENT NO.     : 6,672,767 B2
DATED          : January 6, 2004
INVENTOR(S)    : Kimihiko Hajota et al.

It is certified that error appears in the above-identified patent and that said Letters Patent is hereby corrected as shown below:

<u>Title page,</u>
Item [73], Assignees, please change the country of the first Assignee to read as follows:
-- Nidec Corporation, Kyoto-fu (JP) --

Signed and Sealed this

Twentieth Day of July, 2004

JON W. DUDAS
*Acting Director of the United States Patent and Trademark Office*